No. 858,608. PATENTED JULY 2, 1907.
D. KRMPOTIC.
MACHINE FOR SHELLING GREEN PEAS AND THE LIKE.
APPLICATION FILED JAN. 5, 1906.
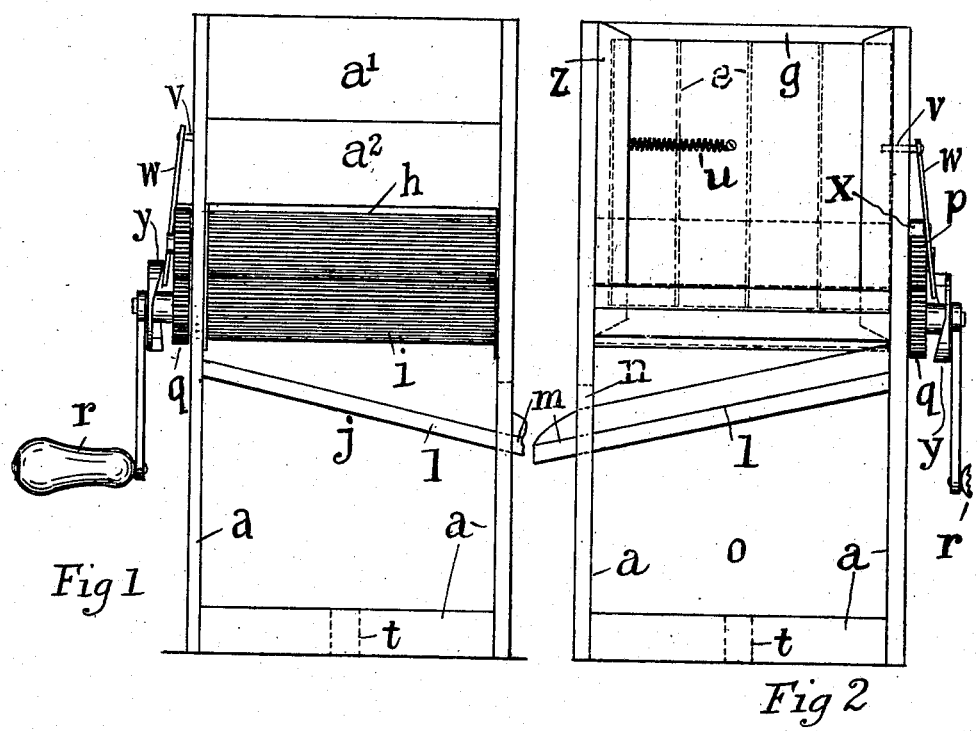
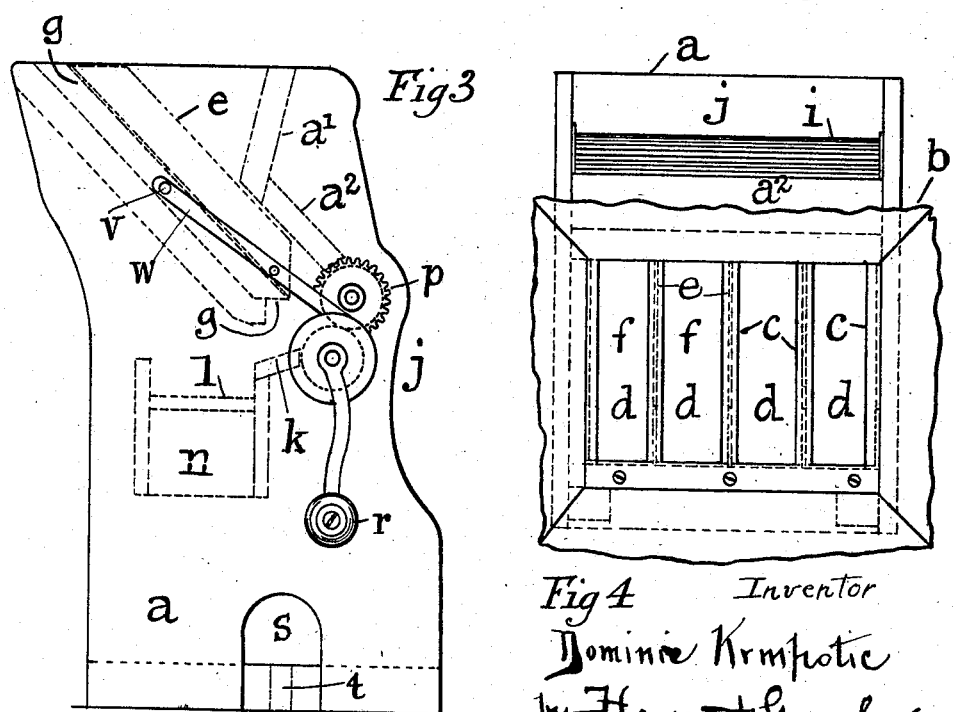

UNITED STATES PATENT OFFICE.

DOMINIC KRMPOTIC, OF BRUNSWICK, VICTORIA, AUSTRALIA.

MACHINE FOR SHELLING GREEN PEAS AND THE LIKE.

No. 858,608.  Specification of Letters Patent.  Patented July 2, 1907.

Application filed January 5, 1906. Serial No. 294,744.

*To all whom it may concern:*

Be it known that I, DOMINIC KRMPOTIC, a subject of the King of Great Britain and Ireland, residing at Brunswick, in the State of Victoria, Commonwealth of Australia, have invented certain new and useful Improvements in Machines for Shelling Green Peas and the Like; and I do hereby declare the following to be a full, clear, and exact description of the invention, such as will enable others skilled in the art to which it appertains to make and use the same.

The object of this invention is to provide a simple machine for kitchen, domestic and general use whereby to shell green peas and the like in a cleanly and very expeditious manner, without subjecting the contents of the pods to the handling they receive by the manual or common mode of shelling.

My machine may be fixed to a table or base, and may have any suitable means for that purpose.

When firmly placed ready for use, it may be fed with unshelled peas in any suitable manner, as with one hand, while a handle may be simultaneously turned with the other, the result being that the machine will discharge empty pods or shells at one side, and will deliver at another side or into a suitable receiver, or by any suitable chute, the peas or the like removed from the pods.

A machine made in accordance with the invention is illustrated in the accompanying drawings, to which however the invention is not limited in so far as it embraces variations, which, to persons skilled in the art, would evidently be practicable.

The machine is shown in Figure 1 in front elevation; in Fig. 2 in rear elevation; in Fig. 3 in side elevation; and in Fig. 4 in plan view, the latter showing part of an optional feed hopper and aliner not shown in Figs. 1 to 3.

In these figures a series of pod chutes are shown provided with shaking or jerking means, but such means may be dispensed with at will, as, for example where the machine is to be made of small size in very cheap form.

Referring now to the drawings $a$ indicates any suitable casing, and $b$ any suitable hopper having at its base a series of elongated alining apertures $d$ between divisions $c$. Suitable pods, as of green peas, are to be fed into the hopper, and these will—as the machine is worked—fall through apertures $d$ (which are made narrower than the slides below mentioned) being placed or shaken in line therewith before they can descend. The narrowness aforesaid is to be sufficient to prevent pods falling through too rapidly.

The machine has a series of slides or narrow channels $f$, suitable for single pods, formed by partitions or ribs $e$, extending from an inclined back $g$, to the top of which the hopper is shown screwed in Fig. 4. The slides form a back to a small hopper the rest of which is formed by the casing sides, and front $a^1$, $a^2$. When hopper $b$ is not used the pods may be placed directly upon the slideways $f$, which vibrate or shake as below described. These slideways are so located relatively to two rollers $h$ and $i$ (of ribbed rubber or suitable surface) that as the rollers are rotated, the ends of the pods that slip down the channels engage between the rollers; a slight lift of the pod points is first produced by the lower roller in the preferred construction.

The rollers are set sufficiently close to one another as to then without undue pressure draw the pods completely between them (squeezing the pods so that they split) and cast them off at the machine front $j$ where any receiver (not shown) may be located. I find it advantageous to have one roller at a higher level than the other and slightly to the front of it. When the pods, split by reason of the pressure aforesaid the contents or peas are (by the drawing action of the rollers on the pods) crowded back and so are compelled to emerge from the shells. This they do at the feed side of the rollers.

To receive these peas the drawings show a slide way or sloping surface $k$ close to roller $i$, and next to said slide way a sloping channel or chute 1, the end $m$ of which projects from casing $a$ so that a dish or other receiver may be conveniently located below, $n$ indicating an aperture in the casing. A receptacle or drawer may however be located and arranged to receive the peas in space $o$ from part $k$. The rotation of the rollers may be effected in any convenient way as by end gear wheels $p$, $q$ at one side of the casing and actuating handle $r$.

$s$ is an aperture in the casing to admit the arm of a clamp when the latter is used to fasten the machine at the edge of a table or the like, and $t$ an aperture in the casing base for fastening the machine down if preferred, as by any suitable bolt and nut.

$u$ indicates a spring connecting back $g$ with the frame $a$; and $v$ a link or pin connecting back $g$ with one end of a lever $w$, which is pivoted as at $x$, and has its other end set in the path of face cams $y$ upon a disk mounted on the spindle of one of the rollers, or in other position whereby the turning of handle $r$ will revolve the cams. The cams vibrate the lever, in turn, by depressing the lever end near them, thus raising the other end, and pulling back $g$, which is loosely or in any suitable manner set in the framing so that it can be vibrated to that side of frame $a$, spring $u$ being stretched. As soon however as a cam end passes the lever, ceasing to support it, the spring becomes normal and so jerks or returns the back to its previous position, thus closing gap $z$ between the back and casing, which occurs when the spring is stretched.

Plate or bar $k$ or the like is set close to roller $i$ and plate or bar $a^2$ close to roller $h$ so as to act as scrapers or guards preventing fragments of peas or pods which may stick to the rollers as the pods are being drawn forward, traveling past the said guards.

What I do claim as my invention and desire to secure by Letters Patent of the United States is:—

In a pod shelling machine, the combination, with a casing, of a series of slideways connected thereto by a spring, ribbed rubber or like rollers adapted to draw pods therefrom, empty the pods, and remove the empty shells, one roller being higher than and forward of the other, a cam wheel on a roller spindle, and a lever connected to the slideways and actuated by the wheel.

In witness whereof I have hereunto set my hand in the presence of two witnesses.

DOMINIC KRMPOTIC.

Witnesses:
 GEORGE G. TURRI,
 ANTHONY J. CALLINAN.